Jan. 25, 1944.  C. H. WHITE  2,340,163
PLANTER
Filed June 10, 1940  3 Sheets-Sheet 1

INVENTOR:
CHARLES H. WHITE
BY
ATTORNEYS.

Jan. 25, 1944.   C. H. WHITE   2,340,163
PLANTER
Filed June 10, 1940   3 Sheets-Sheet 2

INVENTOR:
CHARLES H. WHITE
BY
ATTORNEYS.

Jan. 25, 1944. C. H. WHITE 2,340,163
PLANTER
Filed June 10, 1940 3 Sheets-Sheet 3

INVENTOR:
CHARLES H. WHITE
BY
ATTORNEYS.

Patented Jan. 25, 1944

2,340,163

UNITED STATES PATENT OFFICE 2,340,163

PLANTER

Charles H. White, Moline, Ill., assignor to Deere & Company, Moline, Ill., a corporation of Illinois Application June 10, 1940, Serial No. 339,699

34 Claims. (Cl. 111—51)

The present invention relates generally to planters and the like and is more particularly concerned with planters of the check-row type and has particular reference to the combination of a fertilizer attachment with the planting mechanism in which the fertilizer valve is operated through the operation of the lower seed valve of the planting mechanism.

The object and general nature of the present invention is to provide a check-row planter which is particularly adapted for tractor operation. It has been found that the use of tractor-propelled planting implements introduces a number of problems, not commonly encountered with the slower moving horse-drawn implements, having to do with the provision of mechanism that can be driven and will be efficient and operative at tractor speeds up to five or six miles per hour, or more. As will be readily understood, the efficiency and successful operation of a planting implement depends to a large extent upon the accuracy with which the seeds are deposited. In my prior United States Patent No. 2,243,933, issued June 3, 1941, I have disclosed planting means which includes a lower valve constructed so that the seeds to be deposited are held in contact with the ejecting face of the valve, whereby the operation of the valve results in a pushing action against the seed, rather than striking the seeds with an impact action. I have found that where the seeds are pushed generally downwardly and rearwardly, they do not scatter in the row but remain practically where they strike the ground, whereas if they are struck with an impact action the seed tends to scatter due, I think, to the fact that the seed may lie in different positions and are struck at various points relative to their respective centers of gravity. Commercial forms of planters involving the invention disclosed and claimed in my above-mentioned prior patent have proved to be very accurate, even at the higher tractor speeds.

The present invention is in the nature of an improvement over the planting mechanism shown in said prior patent.

One of the principal features of the present invention is the provision of an enclosed seed passage leading from the upper to the lower valve so that the seed in falling from the upper valve to the lower valve are not affected by movement of the means that operatively connects the two valves. In other words, the cross sectional area of the seed passage does not vary. In certain prior art planters of which I am aware, it has been found through the use of high speed photography that rapidly oscillating parts that form a part of the seed passage leading from the upper valve to the lower valve would sometimes strike the last seed released by the upper valve, delaying the passage of the seed to the lower valve and in some cases actually breaking the seed apart. This type of defective action occurred particularly in prior art machines where the seed passage included a part that moved toward the opposite wall during the time that the seeds were falling from the upper valve to the lower valve. In the construction shown in my prior patent, above mentioned, this disadvantage was not present, due to the fact that the push plate, which connects the upper and lower valves and which forms a part of the seed passage, actually moved away from the path of travel of the seed in falling from the upper valve to the lower valve. It is, therefore, more specifically a feature of the present invention to provide a seed tube and utilize the same as the connection between the upper valve and the lower valve, and preferably the connections are such that the seed tube while being vertically oscillatable, does not experience any great amount of fore and aft or lateral movement. Hence, according to the present invention, the seeds fall from the upper valve to the lower valve without interference, and furthermore, the passageway for the seed is smooth and continuous, with no obstructing parts, shoulders or the like from which a seed may rebound, and there are no relatively movable parts accessible to the seed in falling from the upper valve to the lower valve between which seed might be caught.

Another feature of the present invention is the provision of upper and lower valve means adapted to be operated simultaneously by means which is so connected with the valves that it is not essential that such means be returned to its original position in order to close the valves. According to the present invention, the construction is such that there may be some variation in the position to which the valve operating means may return, yet the valves will for all practical purposes be closed and held closed in such manner as to retain the seed therein.

Still further, another feature of this invention is the provision of means which, in effect, offsets the seed container and seed selecting mechanism relative to the upper valve whereby rebounding of the seed against the side walls of the upper valve structure is to a considerable extent eliminated. Conventional seed selecting mechanism usually includes a seed plate which rotates in a horizontal direction, the seed plate having cells from which the seed therein are ejected downwardly into the upper valve means. It has been found, however, particularly in high speed operations, that the seed plate rotates at such a rate that instead of falling directly downwardly from the seed plate the seed ejected therefrom fall through a laterally extending trajectory which is initially fairly flat, with the result that the seed rebounds from the side walls of the upper valve structure and does not immediately come to rest. As will be readily understood, any delay in the seed coming to rest against the associated valve materially reduces the speed at which the planting mechanism can be operated.

A further feature of the present invention resides in the provision of an improved fertilizer distributor, especially adapted for rapid high speed operation. More specifically, this feature of the present invention comprehends a fertilizer valve which has two parts, one adapted to strike the falling fertilizer and deflect the same rearwardly while the second part receives the deflected fertilizer and divides the same into two lateral sections, which is commonly accepted as the best placement for fertilizer. Previous structures of which I am aware have utilized the principle of splitting the fertilizer stream into two laterally spaced parts, but so far as I am aware it is new to divide the fertilizer stream in this manner with an impact action. This is an especially important feature of fertilizer distribution by planting mechanism that is capable of high speed planting operation.

These and other objects and advantages of the present invention will be apparent to those skilled in the art after a consideration of the following detailed description, taken in conjunction with the accompanying drawings illustrating the preferred form of the invention.

Figure 1:
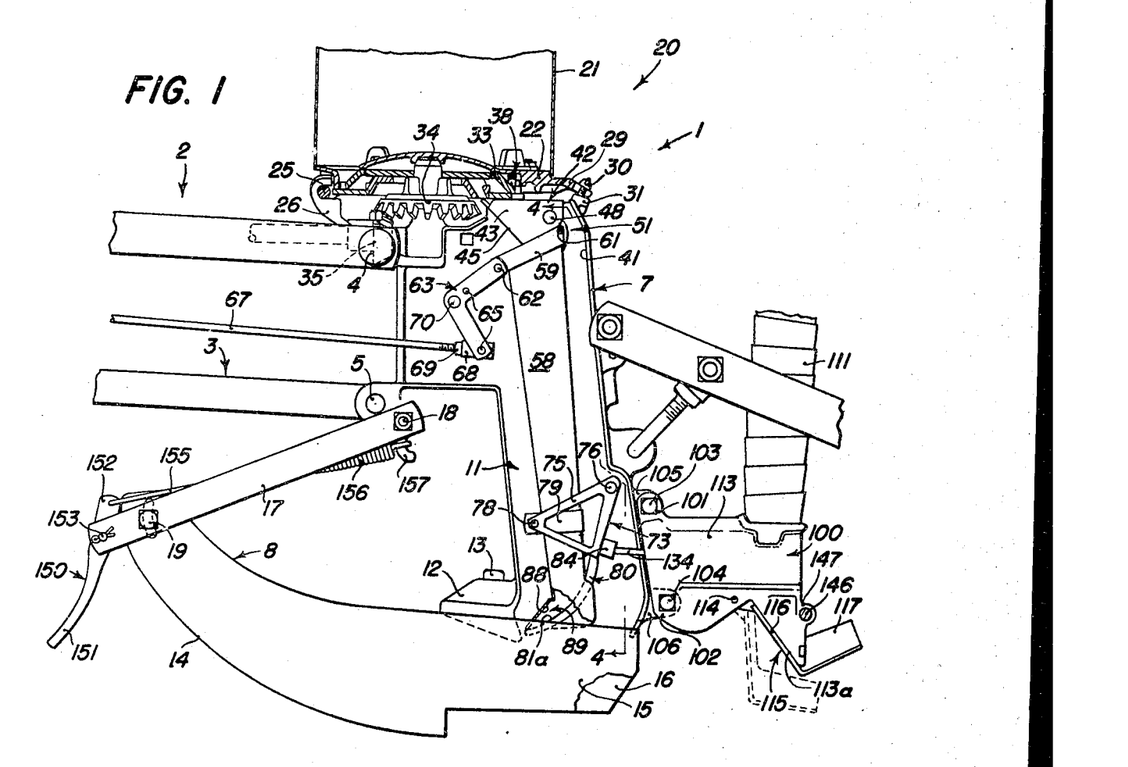
Figure 1 is a side view, with certain parts broken away, of the furrow opener and cooperating parts of a planter in which the principles of the present invention have been incorporated.

Referring now to the drawings, and more particularly to Figure 1, the reference numeral 1 indicates the planting unit of an agricultural implement, such as a corn planter. Inasmuch as this type of planter is old and well known in the art, it is not thought necessary to completely illustrate the same herein. Hence, only such parts of the planter as are necessary to an understanding of the present invention have been shown. Tractor operated planters are usually provided with a plurality of planting units, such as the one indicated by the reference numeral 1, and usually such a planter comprises frame means, which may be the tractor itself, to which each planting unit is connected by draft means, such as a pair of links 2 and 3, which are shown in Figure 1 as pivoted at 4 and 5 to forwardly extending lugs which usually form a part of the furrow opener shank, indicated in its entirety by the reference numeral 7. Various types of furrow openers are in use at the present time, but perhaps the most common type is the type of furrow opener referred to as a sled runner opener, and this is the type of furrow opener that I have shown in the accompanying drawings, as indicated by the reference numeral 8. It is to be understood, of course, that the present invention is in no way dependent upon the use of any particular type of furrow opener; therefore where below I refer to a runner, or to a runner shank, it is to be understood that this is merely for convenience and that the shank 7 and that the furrow opener 8 are merely representative of all equivalent structures. For example, the shank 7 may carry a single disk opener, a double disk opener, a stub runner opener, or any other kind desired, and in some cases the shank 7 can be used with more than one type of furrow opener. In other cases the shank 7 must necessarily be especially constructed or provided with special attachments accommodating some particular type of furrow opener.

The furrow opener shank 7 is preferably a casting which is hollow, as indicated at 11, so as to provide what may be termed a seed passage which accommodates the seed valves and associated mechanism, as well as accommodating the passage of the seed from the upper valve to the lower valve. The furrow opener shank 7 is provided with a forwardly extending lug 12 by which the furrow opener 8 may be fixed thereto in any suitable manner, as by a bolt 13. A furrow opener of the runner type, as indicated at 8, commonly comprises a forward soil engaging knife section 14 and a rear section that comprises two spaced apart plates 15 and 16 which run in the furrow opened by the forward section 14 so as to accommodate the deposition of seed in the furrow. The front end of the furrow opener 8 is reenforced by a pair of braces 17 which are bolted, as at 18, to the runner shank 7 and, as at 19, to the front end of the runner 8. The braces 17 and the front end of the runner are particularly constructed to accommodate a feature of the present invention, to which reference will be made below.

The upper end of each furrow opener shank 7 conventionally carries seed selecting and feeding mechanism, indicated in its entirety by the reference numeral 20. Preferably, the seed selecting and feeding mechanism includes a seed can 21 secured in any suitable manner to a base or support 22, preferably in the form of a casting provided with a pair of forward lugs 24 which are pivoted by a bolt or other suitable means 25 to a forwardly extending lug 26 fixed to or formed integral with the upper portion of the shank 7. The base 22 is also provided with a pair of rear lugs 29 with which a thumb screw 30, pivoted to a lug 31 on the upper end of the shank 7, is adapted to engage for fixing the seed can 21 in operative position. The flow of seed from the seed can or hopper 21 is controlled by a seed plate 33 rotatably mounted at the bottom of the hopper 21 and driven by means of a bevel gear 34 which meshes with a pinion 35, the latter being driven in any suitable manner from the tractor or the ground wheels (not shown), or in any other suitable manner. The hopper bottom 22 is formed so that the seed in the seed cells of the seed plate can drop from the plate only at a certain point, as indicated by the opening 37. Usually, the seed drops by gravity from the seed plate whenever the cells are rotated into a position over the opening 37. However, in the event that the seed should tend to stick in the cells, suitable cut-off and knocker mechanism, indicated in its entirety by the reference numeral 38, is provided. Since the details per se of the mechanism 38 do not form a part of the present invention, except in novel combination with other parts to be described later, it is not deemed necessary to show the knocker and cut-off mechanism 38 in detail. So far as the present invention is concerned, any suitable means for removing, discharging or ejecting the seed from the seed plate at a certain point in the rotation of the seed plate may be used. Therefore, the seed selecting and feeding mechanism just described is representative of any suitable selecting mechanism for dropping a predetermined number of seeds according to the actuation of the seed plate 33 or some other part.

The shank 7 is of the type that includes a main member 39 open at one side which is closed by a plate 40.

Figure 5:
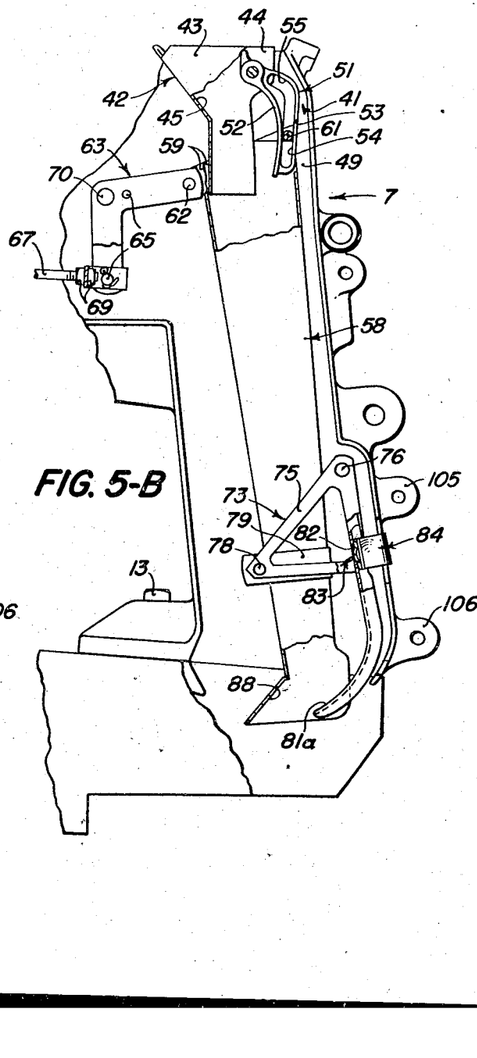
Figures 5a and 5b are side views, similar to Figure 1, showing the slightly open and fully open positions of the seed tube and upper and lower valves, illustrating in particular that the valves remain closed irrespective of slight variations in the upper position of the seed tube.
Figure 6:
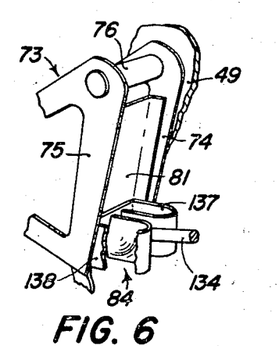
Figure 6 is a perspective view of the lower valve and illustrating the connection between the lower valve and the fertilizer distributing mechanism carried by the planter furrow opener.

The upper end of the runner shank 7 is formed with a seed chamber 41 in which a seed chute 42 is disposed. Preferably, the seed chute 42 comprises a channel-like member having side walls 43 and 44 and an inclined front wall 45. A bolt 46 (Figure 2) extends through an opening in the side wall 44 and an opening in the adjacent portion of the shank 7 for fixing the seed chute 42 in position. The rear portions of the side walls 43 and 44 are apertured to permit the seed chute 42 to be disposed over a stud 48 fixed in one side wall 49 of the shank 7. The rear end of the seed chute 42, when thus supported on the stud 48 and the bolt 46, is open, but is adapted to be closed by an upper valve indicated in its entirety by the reference numeral 51. As best shown in Figures 5—a and 5—b, the valve 51 is pivotally mounted on the stud 48 and is provided with a forward face 52 and a rearwardly disposed cam section 53. The cam section 53 is formed with a long slot 54 and an angularly related slot 55 joining the slot 54 and serving as a dwell portion which will be referred to later. The seed chute 42 and the valve 51 form a seed receiving chamber adapted to receive seed from the seed selecting and feeding mechanism 20, described above, and the movement of the seed from the seed receiving chamber just mentioned is controlled by the opening and closing of the valve 51.

It will be observed that the form or configuration of the seed receiving chamber 42, 51 is quite similar to the seed chamber shown in my above-mentioned prior patent. The present seed receiving chamber 42, 51, like the seed chamber shown in my prior patent, is V-shaped so as to eliminate so far as possible rebounding of the seed falling into the chamber from the seed selecting mechanism above, so as to permit a very rapid opening and closing of the upper valve 51 and the discharge therefrom of the right number of seed without delay. If, for example, the seed discharged into the seed receiving chamber 42, 51 rebounded a few times from one wall to the other, it might be possible that the valve 51 would open and close before the last seed of the group would fall from the chamber 42, 51. This is eliminated by the V-shaped configuration, as more fully explained in my prior patent mentioned above.

Figure 4:
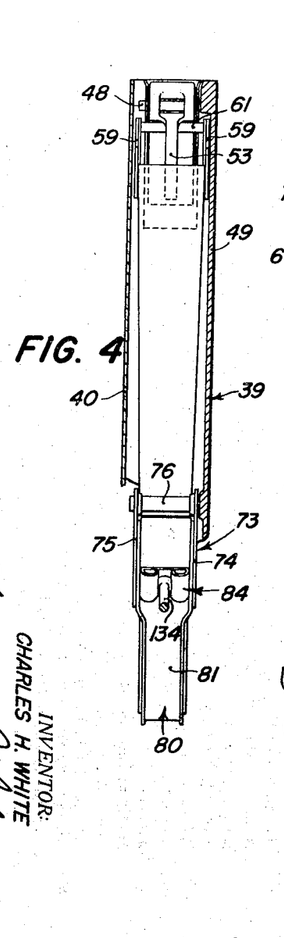
Figure 4 is a sectional view taken generally along the line 4—4 of Figure 1.

The seed discharged from the seed receiving chamber and valve 51 are received in the upper end of a closed seed tube indicated in its entirety by the reference numeral 58 and with the upper end of which the lower end of the seed chute 42 is in telescopic association. Also, the seed tube 58 serves as means for operating the upper valve 51. Referring now more particularly to Figures 1 and 4, the seed tube 58, which is square or rectangular in cross section, carries a pair of arms 59 at its upper end, the ends of each arm 59 extending beyond the front and rear sides of the seed tube. The rear ends of the arms 59 receive a pin 61 which extends through the cam slots 54 and 55, and the forward ends of the arms 59 are apertured to receive a pivot pin 62, the ends of which are fixed to a pair of bell crank levers 63. The latter are rigidly secured together in spaced apart relation by a pair of pins 65, which may be identical with the pin 62, one of the pins serving as a pivot to receive the rear end of an operating link 67 preferably connected to the pivot pin 65 by means of a U-shaped yoke 68. The intermediate portion of the latter is apertured to receive the rear end of the link 67, and the ends of the yoke 68 are apertured to receive the pin 65. Lock nuts 69 are threaded onto the rear end of the link 67 so as to fix the yoke 68 rigidly to the link 67 in adjusted relation. A cotter pin is carried by the pivot pin 65 and serves to fix the yoke 68 against lateral movement relative to the pivot pin. Levers 63 are pivoted on a stud 70.

It should be pointed out at this time that the planting unit 1, in which the principles of the present invention have been incorporated, is adapted for check-row operation. As will be readily understood, check-row planters are provided with valve mechanism which is opened and closed under the control of a check wire through the medium of a check fork, the check wire having buttons thereon which periodically rock the check fork and open the valve. At the same time, the rocking of the check fork also controls a clutch by which power is intermittently delivered to the seed plate to advance it a predetermined but adjustable amount so as to deliver the right amount of seed into the upper valve chamber. The link 67, which controls the seed tube 58 through bell cranks 63, is connected to be actuated by a check fork of the usual construction, and from Figure 1 it will be seen that rocking movement of the bell cranks 63 causes the seed tube 58 to oscillate in a generally vertical direction within the chamber 11 of the hollow runner shank 7. The cam 54, 55 is so formed that vertical oscillation of the seed tube, which carries the pin 61 that is disposed in the slot 54, 55, to open and close the valve 51, the valve being closed when the seed tube is in its upper position and open when the seed tube is in its lower position. Normally, the seed tube 58 is held in its upper position by any suitable means, which may be associated with the check fork, although any other suitable means may be employed, as desired.

The lower end of the seed tube, which slightly decreases in cross section toward the lower end thereof, is provided with suitable lower valve means which is secured to or forms a part of means which swingably supports the lower portion of the seed tube. As best shown in Figures 1 and 4, an arm 73, which comprises two laterally spaced sections 74 and 75, is pivotally mounted on a stud 76 which is fixed, like the stud 48, to the wall 49 of the runner shank 7, the stud 76 being disposed to the rear of the seed tube 58. The forward ends of the arm sections 74 and 75 are apertured and receive a pin 78 secured thereto and serving to pivotally support the lower portion of the seed tube 58 by means of a yoke 79 which encircles the seed tube and extends forwardly so as to pivotally receive the pin 78. A lower valve 80 is secured to the arm 73 and is of particular construction. The valve 80 is in the form of a curved channel member which is disposed at its upper end between the two arm sections 74 and 75 and, being fixedly secured thereto, serves to maintain the arm sections in laterally spaced apart relation so as to embrace the lower portion of the seed tube 58. The valve channel member is indicated by the reference numeral 81 and is apertured at 82 to receive the socket portion 83 of a spring yoke 84 to which reference will be made below. The lower end 81a of the valve member 81 curves downwardly and forwardly so that the lower section thereof is disposed at such an angle that it extends generally in a circular direction relative to the axis of the stud 76, about which the lower valve 80 and the arm 73 pivot. The purpose of this particular arrangement will be explained below.

The lower end of the seed tube 58, which is formed in a particular manner so that it may be considered as a part of the lower valve mechanism, is formed with a downwardly and forwardly inclined wall 88 which, with the lower end of the valve member 81, forms a lower valve chamber of substantially V-shaped configuration, whereby rebounding of the seed falling into the lower valve mechanism is substantially eliminated. It will be noted, particularly from Figure 1, that the lower valve chamber, indicated by the reference numeral 89, is formed by the lower portion of the valve member 81 extending generally forwardly underneath the cooperating wall portion 88 of the seed tube 58. The lower end of the valve member 81 therefore serves to hold the seed in the lower chamber 89 up against the lower downwardly and rearwardly facing surface of the wall 88. This surface therefore forms, when the valve 81 is opened, a seed ejecting surface which pushes the seed downwardly and rearwardly into the furrow opened by the furrow opener 8, instead of striking them with an impact blow which, it has been found, tends to scatter the seed. Ejecting the seed with a general pushing action, even though rapid, maintains the seed in a relatively small bunch.

Figure 2:
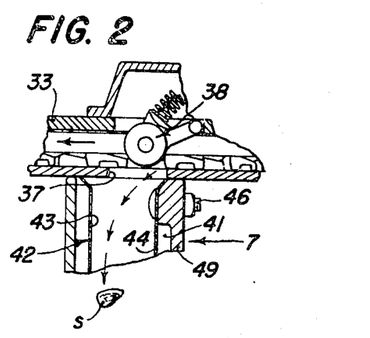
Figure 2 is a fragmentary sectional view, taken generally along the line 2—2 of Figure 3 showing the relation between the hopper bottom and the upper valve chamber.
Figure 3:
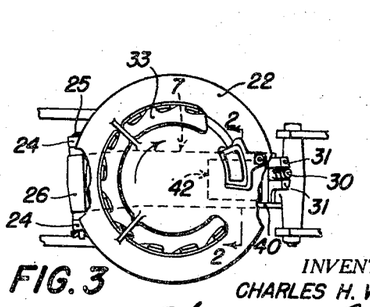
Figure 3 is a top view looking downwardly at the upper end of the runner shank, illustrating the offset relation between the hopper bottom and the upper valve means.

Before describing the operation of the valve mechanism, as set forth above, the particular way of mounting the seed selecting and feeding mechanism 20 with respect to the valve mechanism will be described. Referring now more particularly to Figures 2 and 3, it will be noted that the forward hopper receiving lug 26 of the runner shank 7 and the rear lugs 31 are not disposed in a fore and aft line coinciding with the generally fore and aft axis of the shank 7 and associated valve mechanism. Instead, the forward lug 26 is disposed slightly to the left (Figure 3) and the rear lugs 31 slightly to the right, thus offsetting the hopper in a counterclockwise direction (Figure 3) relative to the upper valve chamber 42, 51 that receives seed from the seed selecting mechanism 20. In this figure the upper end of the shank 7 and the upper valve means have been indicated in dotted lines in order to show the relation therewith of the rotatable seed plate and knocker means 36, and from Figure 2 it will be noted that the opening 37 in the hopper bottom and the knocker mechanism 36 are disposed an appreciable distance to the right (Figure 2), or in a counter-clockwise direction (Figure 3), from the upper valve chamber 42, 51. In operation, the seed plate 33 rotates in the direction of the arrow (Figures 2 and 3). As will be understood by those familiar with check-row planters, the seed plate is intermittently actuated to advance one or more seed cells into a position generally above the runner shank so that the seed in said cells drop into the controlling valve mechanism, generally along the path indicated by the small arrows in Figure 2, a kernel of corn being shown at s. Ordinarily, gearing is provided whereby the farmer may set the planter so as to drop two, three or four seed at a time into the upper valve. As will be seen from Figure 2, according to the present invention, the hopper and associated parts are so placed relative to the shank 7 that the seed whether two, three or four, are ejected from the seed plate at a point before the seed cells reach a position directly above the upper valve chamber. The reason for this arrangement is to accommodate the relatively rapid rotation of the seed plate, such as takes place when the planter is propelled by a tractor at rates of speed commonly used in tractor operation. As shown in Figure 3, the seed selecting unit is, in effect, offset in a direction opposite to the direction of rotation of the seed plate, as by being rotated in a generally horizontal direction about the axis of rotation of the gear 34, which is supported at the upper end of the runner shank 7. However, the desired amount of offset may be obtained by other means, such as being offset by a lateral displacement, rather than an angular offset. However, the structure disclosed in the drawings is the preferred means for carrying out this feature of the present invention, inasmuch as it has certain advantages from a manufacturing standpoint. For example, the seed selecting and hopper unit employed in the construction shown in the drawings may be interchangeable with other seed selecting units not necessarily adapted for tractor speed operation.

The present invention also contemplates the provision of new and improved fertilizer distributing means which is, in effect, geared to the high speed valve mechanism just described, and which is, moreover, particularly constructed to accommodate the relatively rapid action which is required in a fertilizer distributor that is to be actuated by a high speed planting valve mechanism.

Figure 7:
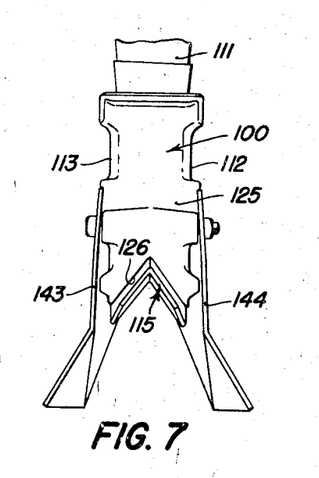
Figure 7 is a rear view of the fertilizer distributing valve and associated parts.
Figures 8, 9, 10, 11:
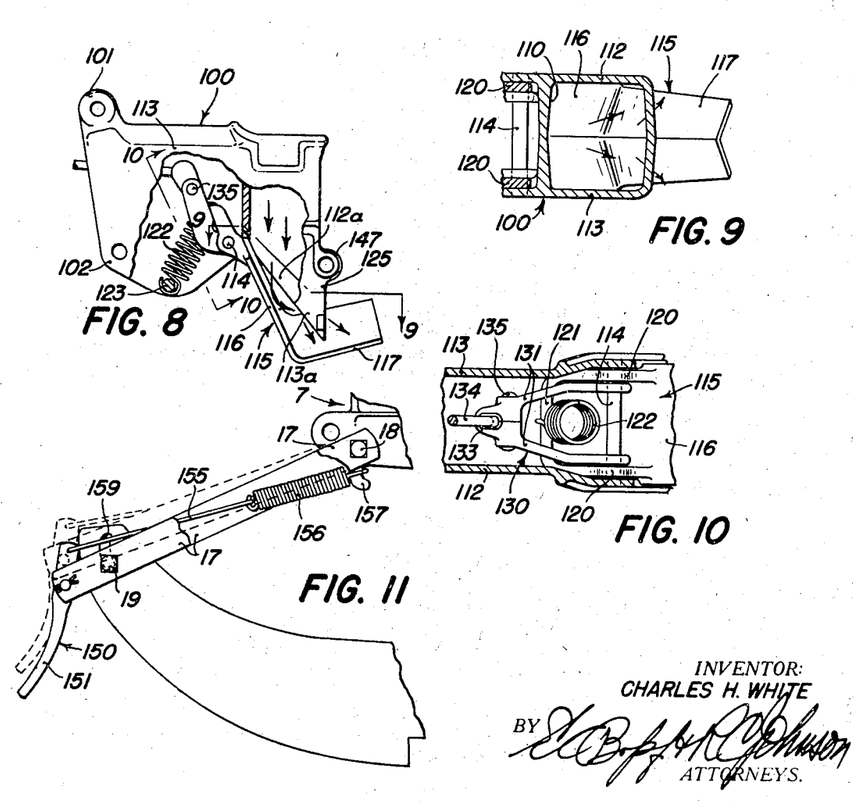
Figure 8 is a view of the fertilizer valve in its partially closed position, illustrating the operation thereof wherein the fertilizer is deflected rearwardly and then split into laterally spaced portions by the upwardly angled part of the fertilizer valve.
Figure 9 is a section taken generally along the line 9—9 of Figure 8, illustrating the manner in which the fertilizer stream is divided.
Figure 10 is a section taken along the line 10—10 of Figure 8, illustrating a portion of the connections between the seed valve mechanism and the fertilizer distributing valve mechanism.
Figure 11 is a fragmentary side view of the trash kicker arm, illustrating the feature of the present invention wherein the position of the arm and its support may be varied relative to the furrow opener but without causing any variation in the angle at which the arm normally is disposed relative to the ground.

Referring now more particularly to Figures 7, 8 and 9, the reference numeral 100 indicates a fertilizer boot casting having at its forward portion a pair of lugs 101 and 102 which are adapted to be secured, as by bolts 103 and 104, to lugs 105 and 106 secured at the rear lower portion (Figure 1) of the runner shank 7. The passage comprising the fertilizer boot proper is indicated at 110 and fertilizer is directed thereto through a fertilizer tube 111 of conventional construction. The fertilizer tube 111 is a part of, and therefore represents, any suitable fertilizer feeding mechanism the details of which do not per se form a part of the present invention. The opposite side walls, indicated at 112 and 113, of the casting 100 are apertured to receive a pivot pin 114 which pivotally supports a fertilizer valve 115. The valve 115 includes two angularly related sections 116 and 117, the former being generally flat, having only a slightly raised central portion, generally in the middle of the section 116, but the rear valve section 117 is formed of substantially inverted V-shaped configuration which at its forward portion merges into the flatter portion 116. The forward and upper end of the section 116 is provided with a pair of apertured lugs 120, the upper ends of which are connected by a transverse part 121 to which a spring 122 is connected at its upper end. At its lower end the spring 122 is anchored to a lug 123 carried by, and preferably formed integral with the fertilizer boot 100. The spring 122 acts at all times to move the valve 115 to its closed position. The rear wall, which is indicated at 125, of the fertilizer boot 100 is formed as an inverted V, as indicated at 126 (Figure 7), so as to receive the section 117 of the fertilizer valve. At the rear portion of the fertilizer boot 100 the side wall sections 112a and 113a adjacent the valve 115 have their lower edges disposed in a rearwardly and downwardly inclined plane against which the flat section 116 of the valve 115 fits in substantially leak-tight relation when the V-shaped section 117 of the valve 115 is disposed in the V-shaped notch 126. Normally, therefore, the spring 122 holds the valve 115 closed so that no fertilizer can flow from the fertilizer passage 110.

The fertilizer valve 15 is connected so as to be opened at the same time that the seed tube 56 is actuated to cause seed to be deposited in the furrow opened by the runner 8. To this end, a connection is established between the valve 115 and the lower seed valve 80. As best shown in Figure 10, a yoke 130 has two spaced apart sections 131 pivoted on the pin 114 and disposed on opposite sides of the spring 122. The outer or forward end of the yoke is formed with a socket 133 in which the rear ball end of a link 134 is received. Preferably the yoke 130 is made of two parts secured together by a rivet 135. The forward ball end of the link 134 is detachably received in the spring clip or yoke 84 secured in any suitable manner to the rear side of the valve 81. The yoke 84 has two spaced apart spring arms 137 and 138, and the central part of the yoke 84 is formed with the depression or socket 83 which is received within the aperture 82 in the valve 81. The spring arms 137 and 138 effectively hold the forward ball end of the link 134 in position but permit its ready detachment whenever it is desired to remove the fertilizer boot 100. In attaching the link, all that it is necessary to do is to push the member 134 into place between the spring arms 137 and 138.

An important feature of this particular part of the present invention resides in the fact that if it should occur that a lump of fertilizer lodges in between the valve 115 and the fertilizer boot and holds the valve open, the connection between the fertilizer valve and the seed valve is such that the latter is not held open, even though the fertilizer valve should be held in open position. This is true because the yoke 130 merely engages the central section 121 when the fertilizer valve 115 is being opened, and if the valve 115 should remain open there is nothing to prevent the yoke 130 from moving away from the section 121. However, as soon as the obstruction, such as the lump of fertilizer just mentioned, is removed, the spring 122 will close the fertilizer valve 115.

From the above construction it will be seen that whenever the lower seed valve 80 is opened, as by swinging rearwardly and downwardly, the movement of the lower seed valve exerts a rearward thrust through the link 134 against the valve 115, opening the latter. Then when the seed valve 80 closes, the spring closes the fertilizer valve 115. When the fertilizer valve 115 is wide open, as indicated in dotted lines in Figure 1, it will be noted that the V-shaped valve portion 117 is disposed substantially directly underneath the fertilizer passage 110. Thus, the falling fertilizer is split into two streams and is deposited on opposite sides, either above or below the seed. However, the valve 115 is held open only a short moment, the seed and fertilizer valves opening and closing something like 140 or more time per minute at speeds around five or six miles an hour. When the valve 115 starts to close the flat portion 116 strikes the falling fertilizer and, due to the angular relations involved and the downward velocity of the fertilizer itself, the fertilizer is deflected rearwardly with something like an impact or striking action, particularly noticeable at the higher speeds. However, the fertilizer thus thrown rearwardly does not fall directly above or onto the seed but is split by the angled section 117 so as to fall on opposite sides of the seed. The action of the fertilizer, especially the impact action and the splitting of the rearwardly deflected portion of the fertilizer is indicated by small arrows in Figure 8. This is an important feature where the planter is operated at the higher tractor speeds.

Fertilizer runner plates 143 and 144 are bolted to opposite sides of the fertilizer boot casting 100. Preferably, the runner plates 143 and 144 are disposed over the pin 114 thereby serving to hold the latter in position. The runner plates are shaped to provide the desired furrow for the deposition of the fertilizer in two laterally separated bands, one at each side of the seed. The plates 143 and 144 are secured in place by the bolt 104 and a rear bolt 146, the latter extending rearwardly through a lug 147 formed on the fertilizer boot casting 100.

In order to clear away trash, such as corn stalks and other debris lying on the ground or embedded in the ground closely adjacent the surface, I provide a novel form of trash cleaner in which a pivoted arm is mounted at the front end of the planter runner and is moved through the soil with its end an inch or so below the surface, thereby pushing to one side any stalks or other debris that might interfere with the proper penetration of the planter runner 14. Referring now more particularly to Figures 1 and 11, the trash cleaner arm is indicated by the reference numeral 150 and comprises a forwardly and downwardly curved section 151 and an upper flattened section 152, the latter being apertured at two points, one to receive a pin 153 by which the arm 150 is pivotally mounted on the forward ends of the braces 17, and the other aperture serving to receive a link 155, which is preferably in the form of an endless loop the rear end of which is engaged by a spring 156. The rear end of the spring is anchored to a lug 157 formed on or carried by the runner shank 7. Mention was made above to the fact that the braces 17 are bolted at 19 to the front end of the runner blade 14. To this end, the runner blade is provided with a slot 159 in which the bolt 19 is disposed. The provision of the slot makes it possible to raise or lower the braces 17, merely by loosening the bolt 19 and moving the braces to their new position. This raises and lowers the position of the trash arm 150 relative thereto. I have found, however, especially for high speed tractor operation, that the arm 150 should be disposed at about the angle shown in Figure 1, and therefore in order to retain this angle even though the braces 17 are raised and lowered relative to the runner blade 14 in order to accommodate different depths of penetration, I have arranged to have the upper end of the arm 150 rest against the forward end of the runner, and I have so shaped the forward end of the runner so that regardless of in what position the braces 17 may be disposed, the arm 150 is always held at the proper angle. This action is illustrated in Figure 11 which shows the two extreme positions of the braces 17 and the arm 150. As will be readily understood, the spring 156 exerts a positive force holding the upper end 152 of the arm 150 against the end of the runner 14 at all times. In effect, this provides a prestressed trash cleaner which normally remains in the position shown, yet if an abnormal obstruction is encountered, the spring 156 yields.

The operation of the planter, with the fertilizer attachment and the trash cleaning attachment, as described above, is substantially as follows.

As the planting machine is drawn through the field the conventional check-row mechanism periodically exerts a pull on the link 67 to open the seed valves and, at the same time, suitable clutch mechanism is momentarily engaged to advance the seed plate 33 an amount sufficient to drop the two, three or four seeds into the upper valve chamber 42, 51. As the link 67 is drawn forwardly, the bell crank 63 is rocked in a clockwise direction (Figure 1) which pushes the seed tube 58 downwardly. The pin 61 first moves within the upper section 55 of the cam slot 55, 54 without opening the valve 51. However, as soon as the seed tube 58 moves downwardly an extent sufficient to bring the pin 61 past the dwell portion of the cam slot, the valve 51 begins to open. Unlike the generally horizontally shiftable upper valve members, upon which in many instances the seed rests until the valve is practically in its wide open position, in the present invention the seed drop from the upper valve chamber shortly after the valve 51 begins to open, due to the V-shaped configuration of the valve chamber and the fact that the seed drop therefrom as soon as the valve has opened only a slight amount. At the same time that the upper valve is opening, due to the downward movement of the seed tube 58, the same downward movement of the latter serves to swing the lower valve 80 downwardly and rearwardly, thereby opening the lower valve chamber 89. The angular relation of the arm 73, the pivots 76 and 78, and the lower end 81a is such that, first, as the seed tube 58 moves downwardly it follows the downward movement of the lower end of the valve 81 which, due its curvature, is more or less arcuate about the axis of rotation, at 76. Since the lower wall 88 follows, for a time, the lower end 81a of the valve 81, the valve chamber 89 is not opened immediately. However, after the arm 73 has moved through an appreciable angle, the valve member 81 is swung rearwardly at an accelerated rate, faster than the rearward and downward movement of the seed ejecting face 88 of the seed tube 58. However, during this time the lower end of the valve member 81 holds the seed up against the ejecting face 88 so that when the valve 81 does open the seed are pushed out of the chamber 89 in a rearwardly and downwardly extending direction, instead of being knocked out with an impact action, as in prior valves. As will be readily understood, where the valve mechanism comprises some part that ordinarily is spaced away from the seed but is moved against the same so as to strike the seed and eject them, the fact that the seed are struck tends to scatter the seed, since the direction in which they rebound after being struck depends to a considerable extent upon the relation between the striking face and the center of gravity of each seed. On the other hand, where the seed merely are pushed out and particularly where they are normally held in contact with the ejecting face, such pushing action discharges the seed in one bunch and they do not scatter.

Thus, when the check wire actuates the associated check fork, the seed lying in the upper chamber 42, 51 are dropped toward the lower chamber 89, while the seed in the latter chamber are pushed rearwardly. At the same time, the seed plate 33 associated therewith is advanced and the correct number of seed released therefrom and fall into the upper seed chamber 42, 51. However, due to the fact that the seed plate itself rotates rapidly in a horizontal direction, the seed ordinarily would strike one wall of the seed chamber 42, 51 if they were released at a point directly above the seed chamber, as in conventional practice, and would rebound from side to side. This does not occur to any objectionable extent, however, in the present invention, due to the fact that by virtue of the offset relation between the seed selecting and feeding mechanism and the valve mechanism as described above, the seed are released a predetermined distance before the seed are over the upper valve chamber. Thus, if it may be considered that the seed released from the seed chamber 33 have a trajectory, as indicated by the arrows in Figure 2, the upper portion thereof lies in laterally spaced relation away from the valve chamber while the more sharply curved downward portion thereof extends within the upper valve chamber, thereby eliminating the lateral rebounding of the seed which would otherwise occur at the higher planting speeds. As mentioned above, the rebounding of the seed is also further reduced or eliminated by the V-shaped configuration of the upper chamber 42, 51.

At the same time that the lower valve 81 is swung downwardly and rearwardly the fertilizer valve 115 is opened by the connections 130, 134, and after the valve 115 is opened the spring 122 almost immediately closes the same so as to cause the flat portion 116 to strike the fertilizer and deflect the same generally rearwardly while the rear angled portion 117 splits the deflected fertilizer in the two laterally disposed streams. Here the scattering of the fertilizer, due to the impact action, which is objectionable so far as the seed is concerned, is advantageous in that the fertilizer is distributed over an appreciable extent of the soil at each side of the closely bunched seeds. The fertilizer valve 115 and associated parts may be locked in open position when it is desired to drill corn; and to this end, the particular construction of the valve 115 shown and described above is advantageous in that the angled section 117 is of sufficient extent so that all fertilizer fed down through the passage 110 is divided into two laterally spaced strains. In other words, the angled section 117 has two functions. First, when checkrowing, the section 117 splits the fertilizer that is thrown rearwardly by the flatter portion 116 of the valve, and second, when drilling, the section 117 serves as a divider to split the fertilizer that is continuously fed down through the passage 110.

The trash cleaner, being prestressed as described above, normally remains in the position shown and may be adjusted for different depths of penetration by loosening the bolt 19 and moving the braces 17 so as to dispose the trash cleaner in the position desired. The end of the runner blade 14 is shaped so that during this adjustment the angle of the trash cleaner arm with respect to the ground is not appreciably changed.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. In a planter, a generally vertically oscillatory seed tube, valve means closing the lower end of said tube, and means pivotally supporting the lower end of said tube on said valve means.

2. In a planter having a furrow opener shank, a generally vertically oscillatory seed tube, upper valve means connected with said seed tube and controlling the movement of seed to said seed tube, a valve member adapted to close the lower end of said tube in one position thereof and mounted for pivotal movement on said shank, means supporting the lower end of said tube on said lower valve member, means separate from said upper valve means for supporting the upper end of said seed tube, and means separate from said valve means for oscillating said seed tube so as to open and close said valve means and valve member.

3. In a planter, a hollow furrow opener shank, a generally vertically disposed seed tube movably carried in said shank, means pivotally connected with said shank for supporting the upper end of said seed tube and oscillating the same generally vertically within said shank, means serving as an arm pivotally connected with said shank adjacent the lower end of said tube, means pivotally connecting the arm means with said tube whereby the lower end of the latter is supported for generally vertical oscillation on said arm means, and means carried by said arm means for closing the lower end of said seed tube in one position of said arm means and said seed tube.

4. In a planter, upper and lower seed valves movable from opened to closed positions, a member for moving said valves from one position to the other, and means connecting said member with at least one of said valves whereby at least said one valve will be held in one of its positions irrespective of small variations in the corresponding position of said member.

5. In a planter, upper and lower seed valves movable from opened to closed positions, a member for moving said valves from one position to the other, and means operatively connecting said member with both of said valves whereby each valve will be held in substantially closed position irrespective of small variations in the corresponding position of said member.

6. In a planter, a seed valve adapted to be opened and closed, an operating member for controlling said valve, and cam means connecting said operating member with said valve, said cam means including a dwell portion serving to hold the valve substantially against movement in one position during a part of the movement of said member.

7. In a planter, valve means comprising a pair of cooperating parts normally in contact at their ends when the valve means is closed, means supporting one of said parts for movement about a pivot axis, the other of said parts being connected with said one part whereby swinging movement of the latter separates said parts, the contacting parts being formed to extend generally in an arcuate direction, relative to said pivot axis, whereby said parts can move an appreciable distance before appreciable separation of said parts takes place.

8. In a planter, an upper seed valve adapted to be opened and closed, an oscillatory member for controlling said valve, means connecting said operating member with said valve whereby the latter is held substantially against movement in one position during a part of the movement of said member, lower valve means comprising a pair of cooperating parts normally in contact at their lower ends whereby the lower valve means is closed, means supporting one of said parts for movement about a pivot axis, the other of said parts being connected with said one part whereby swinging movement of the latter separates said parts, the contacting parts being formed to extend generally in an arcuate direction, relative to said pivot axis, whereby said parts can move an appreciable distance before appreciable separation of said parts takes place, and means connecting one of said parts with said oscillatory member whereby the latter controls said upper and lower valve means and is operative to hold the latter closed irrespective of small variations in the corresponding position of the oscillatory member.

9. In a planter, seed receiving valve mechanism, seed selecting mechanism movable into a position adjacent said valve mechanism to deliver seed thereto, and means for releasing seed from said seed selecting mechanism before the latter reaches a position above said valve mechanism so as to facilitate the discharge of seed into the latter notwithstanding the motion of the seed due to movement of said selecting mechanism.

10. In a planter, a furrow opener shank having seed receiving valve mechanism therein and carrying seed plate rotating means rotatable about a generally vertical axis, a seed can unit including a hopper having a hopper bottom provided with generally diametrically disposed attaching means, a seed plate having seed cells and rotatable in a generally horizontal plane, and means adjacent one of said attaching means for discharging seed from said seed cells during rotation of said seed plate, and attaching means on said shank for fastening said seed can unit in place with said seed plate in driving relation with said seed plate rotating means, the attaching means on said shank being displaced angularly about said axis relative to said seed receiving valve mechanism so that when said seed can unit is mounted in place on said shank by said attaching means, said seed can unit is displaced angularly about said axis in a direction opposite to the normal direction of rotation of said seed plate, whereby the seed is released from the cells of said seed plate a predetermined distance before the seed reach a position above said valve mechanism.

11. In a planter, a fertilizer distributor comprising a fertilizer boot, and a valve at the outlet end thereof having a first portion which closes said outlet and a second section which is disposed substantially underneath said outlet when the valve is open for distributing fertilizer flowing therethrough.

12. A fertilizer distributor as defined in claim 11, further characterized by said second portion of the valve being disposed at an angle to the first portion and including two generally longitudinally extending downwardly diverging wall sections, the upper meeting edges of which are substantially horizontal and disposed substantially directly underneath the outlet of said fertilizer boot when said valve is open.

13. A swingably mounted fertilizer valve comprising two sections so angularly disposed with respect to one another that during the closing of the valve one section strikes the falling fertilizer and directs the latter against the other section.

14. In a planter, a fertilizer distributor comprising a fertilizer boot having a fertilizer outlet at the lower end thereof, and a pivotally mounted valve disposed adjacent said outlet, said valve including a part having two angularly related sections, one section being adapted when the valve is closed to close said outlet and the other section being wedge-shaped and so angularly disposed relative to said first section that when the valve is closing said first section strikes the falling fertilizer and directs it against the second section and the wedge-shaped formation of said second section serving to deflect said fertilizer laterally.

15. In a fertilizer distributor, a fertilizer boot having an outlet opening, the plane of which is disposed angularly upwardly, a fertilizer valve pivotally carried by said fertilizer boot and including a first section which is generally flat and is adapted to close said inclined fertilizer outlet and a second section disposed at an angle to said first section and of substantially inverted V-shaped configuration, said V-shaped section being substantially horizontal and disposed underneath said fertilizer outlet when the valve is open, and means for swinging said valve a distance sufficient to open the same and dispose said V-shaped section in generally horizontal position underneath said outlet.

16. In a fertilizer distributor, a fertilizer boot having an outlet at its lower end, one wall of said boot having formed therein a notch, and a valve member pivotally mounted on said boot adjacent the opposite wall and including a first section adapted to close said outlet and a second upwardly turned section at the other end of said first section, the notch in said one wall receiving said upwardly turned section when the valve is closed.

17. In a fertilizer distributor, a fertilizer boot having an outlet at the lower end thereof, a swingably mounted valve adapted when closing to strike the fertilizer passing out of said outlet and deflect the same generally rearwardly, and a generally wedge-shaped part adapted to receive said deflected fertilizer and divide the same into two laterally spaced portions.

18. In a planter, a furrow opener having a shank, planting means for depositing seed in said furrow, and a fertilizer distributor comprising a fertilizer boot having an outlet at its lower end, a swingably mounted valve adapted to close said opening and arranged when moving into closed position to strike fertilizer flowing through said outlet and deflect the same generally rearwardly, and generally wedge-shaped means adapted to receive said deflected fertilizer and divide the same into two laterally spaced portions at each side of the seed deposited by said planting means.

19. A planter comprising a furrow opener shank, a lower valve means pivoted to said shank for generally fore and aft swinging movement, a fertilizer boot fixed to said shank generally rearwardly of said lower valve and having a fertilizer opening, a fertilizer valve pivotally carried by said fertilizer boot and movable into and out of a position closing said fertilizer outlet, and a link pivotally connected to said lower valve and having a one-way connection with said fertilizer valve whereby movement of the link in one direction serves to open said fertilizer valve but the lower valve may close independent of the closing of the fertilizer valve.

20. In a planter, a hollow furrow opener shank, a generally vertically disposed seed tube movably carried in said shank, means pivotally connected with said shank for supporting the upper end of said seed tube and oscillating the same generally vertically within said shank, an upper valve movably mounted in the upper portion of said shank and controlling the passage of seed into the upper end of said seed tube, means on the seed tube for opening and closing said upper valve, means supporting the lower end of said tube for oscillation in said shank, and valve means controlled by oscillations of said seed tube for closing the lower end of the latter.

21. In a planter, a hollow furrow opener shank, a generally vertically disposed seed tube movably carried in said shank, a bell crank pivoted on said shank, means connected with one arm of the bell crank for oscillating the latter, means supporting the upper end of said seed tube on the other arm of the bell crank, an upper valve for controlling the flow of seed to said seed tube, and means for causing movement of said seed tube to open and close said upper valve.

22. In a planter, a hollow runner shank, a seed chute stationarily supported at the upper end of said shank, an oscillatory seed tube movably mounted in said shank and having its upper end in telescopic relation with the lower end of said stationary chute, valve means controlling the movement of seed from said seed chute into said oscillatory seed tube, means for oscillating said seed tube, and means whereby said seed tube controls said valve means.

23. In a planter, a shank, an upper and a lower seed control member pivotally mounted on upper and lower portions, respectively, of said shank, an operating member movably connected with both of said seed control members for opening and closing the latter.

24. In a planter, a shank and means for controlling the passage of seed through said shank, said means comprising a valve member pivoted on an axis in fixed relation to said shank, a tubular member adapted to receive seed released by said valve member and reciprocable relative to said shank, and means on said tubular member slidably engaging said valve member for controlling the latter by movement of said tubular member.

25. In a planter, a shank and means for controlling the passage of seed through said shank, said means comprising a valve member pivoted on an axis in fixed relation to said shank, a tubular member adapted to receive seed released by said valve member and reciprocable relative to said shank, said valve member having a slot, and means on said tubular member slidably engaging in the slot of said valve member for controlling the latter by movement of said tubular member.

26. In a planter, a shank and means for controlling the passage of seed through said shank, said means comprising a valve member pivoted on an axis in fixed relation to said shank, a tubular member adapted to receive seed released by said valve member and reciprocable relative to said shank, said valve member having a slot with a dwell portion, and means on said tubular member slidably engaging in the slot of said valve member for controlling the latter by movement of said tubular member, said last mentioned means being operative, when engaging said dwell portion, to hold said valve member in one position during a limited extent of movement of said tubular member.

27. In a planter, a shank and means for controlling the passage of seed through said shank, said means comprising a valve member pivoted on an axis in fixed relation to said shank, an operating member for opening and closing said valve member, the latter having a cam with a dwell portion, and means connected with the operating member and engaging said slot, said last mentioned means being operative, when engaging said dwell portion, to hold said valve member in one position during a limited extent of movement of said operating member.

28. In a planter having a furrow opener shank, a seed valve mechanism therefor comprising a pair of relatively movable parts adapted to be moved into and out of engagement to serve as controlling means for the passage of seed therethrough, means movably supporting said parts on said shank so that the portions of said parts that are adapted to come substantially into engagement move through different paths of movement, said supporting means being arranged so that the paths of movement of said parts are approximately coincidental during a part of the normal opening and closing movement of said parts, and means for causing said parts to swing together, movement of the latter through the above mentioned part of their movement serving to prevent passage of seed therethrough during such movement.

29. In a planter having a hollow runner shank and an upper valve which when open permits seed to drop through said runner, the combination of a lower valve member, and means for actuating the valve member comprising a part in said hollow runner shank so formed that at first it moves generally along the path of movement of and sufficiently close to a portion of said valve member to prevent passage of seed therethrough, and then in a path of movement that diverges from the path of movement of said valve portion so as to provide for the passage of seed therethrough.

30. In a planter, a runner shank, a seed chute stationarily supported at the upper end of said shank, said chute having an open lower end, an oscillatory seed tube movably mounted in said shank and having its upper end disposed about the lower open end of said chute in telescopic relation, means for oscillating said seed tube, and valve means controlled by the oscillations of said seed tube for opening and closing the lower open end of said chute.

31. In a planter having a furrow opener shank, a generally vertically oscillatory seed tube, upper valve means connected with said seed tube and controlling the movement of seed to said seed tube, a valve member adapted to close the lower end of said tube in one position thereof and mounted for pivotal movement on said shank, means supporting the lower end of said tube on said lower valve member, and means separate from said upper valve means for supporting the upper end of said seed tube.

32. In a planter including a runner shank and an oscillatory seed tube therein, means serving as an arm pivotally connected with said shank adjacent the lower end of said tube, means pivotally connecting the arm means with said tube whereby the lower end of the latter is supported for generally vertical oscillation on said arm means, and means carried by said arm means for closing the lower end of said seed tube in one position of said arm means and said seed tube.

33. In a planter, a hollow furrow opener shank, a generally vertically disposed seed tube movably carried in said shank, means pivotally connected with said shank for supporting the upper end of said seed tube and oscillating the same generally vertically within said shank, an upper valve movably mounted in the upper portion of said shank and controlling the passage of seed into the upper end of said seed tube, and means on the seed tube for opening and closing said upper valve.

34. In a planter, a shank and means for controlling the passage of seed through said shank, said means comprising a valve member, an operating member for opening and closing said valve member and normally movable through a given range of movement, and means connecting said valve member and said operating member whereby during a part of the movement of the latter said valve member is shifted and during another part of the movement of said operating member the valve member remains in position.

CHARLES H. WHITE.